Aug. 3, 1965    M. J. LEWIS    3,198,210
SWING-TYPE FAUCET
Filed March 14, 1963    2 Sheets-Sheet 2
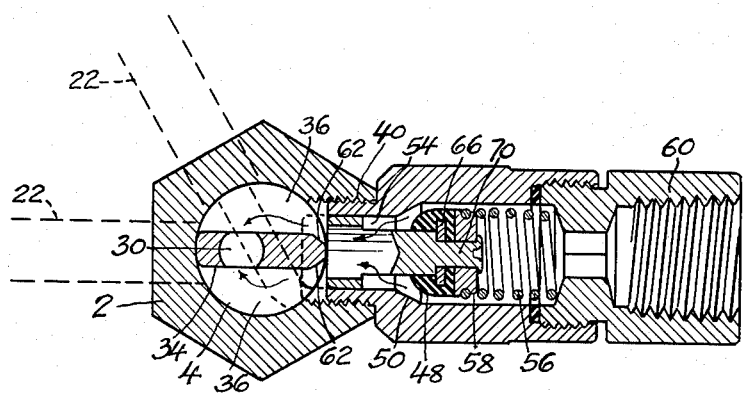
Fig. 3.
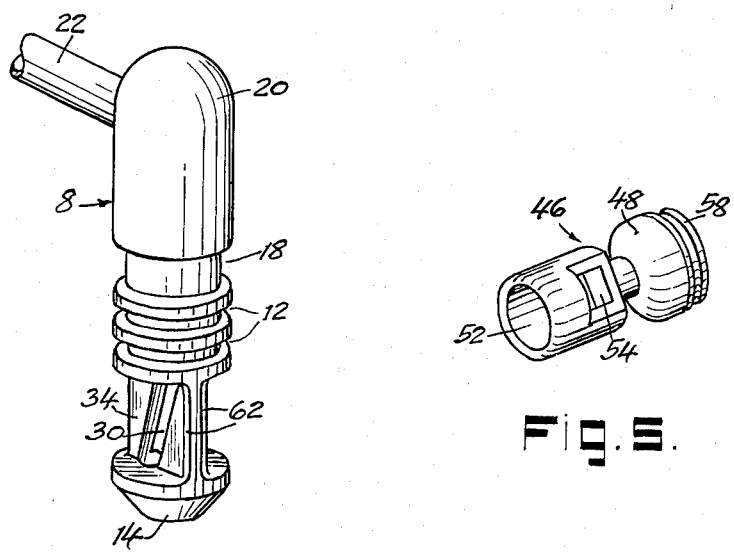
Fig. 4.
Fig. 5.
INVENTOR.
MARTIN J. LEWIS
BY Albert Sperry
ATTORNEY

United States Patent Office 3,198,210
Patented Aug. 3, 1965

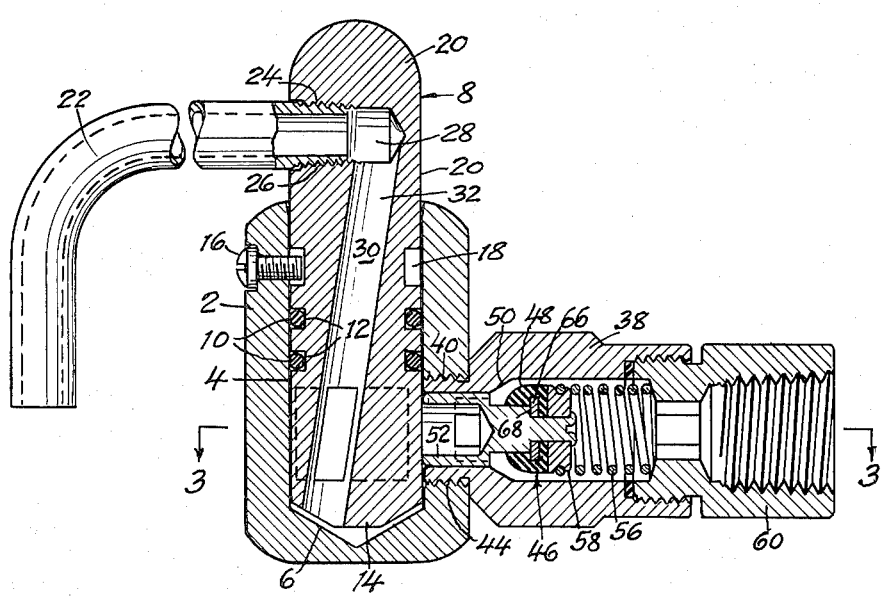

3,198,210
SWING-TYPE FAUCET
Martin J. Lewis, Yardley, Pa., assignor to Franklin Machine Products Co., Inc., West Trenton, N.J., a corporation of New York
Filed Mar. 14, 1963, Ser. No. 265,220
1 Claim. (Cl. 137—616.5)

This invention relates to swing-type faucets and is directed particularly to faucets or valves provided with a discharge spout movable from one position to another to control the flow of fluid through the discharge spout.

Swing-type faucets have many uses and applications. One typical use of such faucets is in restaurants and elsewhere where they are employed for washing or rinsing vegetables and the like.

The swing-type valves heretofore produced have been relatively large, bulky and expensive, and they have not always operated satisfactorily or been constructed in such a way as to permit the faucet spout to be used as a faucet or valve actuating means. Moreover, in using the faucet spout as a valve operating means, the spout is sometimes unthreaded and displaced or broken off so as to render the faucet inoperative.

In accordance with the present invention, these and other objections and limitations in swing-type faucets of the prior art are overcome and a simple, inexpensive and durable type of swing-type faucet is provided.

Accordingly, the principal objects of the present invention are to reduce the size and cost of swing-type faucets and valves, to simplify the construction thereof, and to provide durable swing-type faucets having a spout which is movable from one position to another for the purpose of controlling the flow of fluid through the valve or faucet.

These and other objects and features of the present invention will appear from the following description thereof wherein reference is made to the figures of the accompanying drawings.

In the drawings:

FIG. 1 is a vertical sectional view through a typical form of swing-type faucet or valve embodying the present invention as seen when the valve is opened to permit the flow of fluid therethrough;

FIG. 2 is a vertical sectional view similar to FIG. 1 as seen when the valve is closed;

FIG. 3 is a transverse sectional view of the construction shown in FIG. 1 taken on the line 3—3 of FIG. 1;

FIG. 4 is a perspective illustrating the spindle of the valve shown in FIGS. 1, 2 and 3; and FIG. 5 is a perspective showing the form of valve member and valve stem employed in the swing-type faucet of FIGS. 1 to 4 inclusive.

In that form of the invention chosen for purposes of illustration in the figures of the drawings, the valve or faucet embodies a body 2 having a cavity 4 therein presenting a tapered bearing surface 6 at the lower end of the cavity. A valve spindle 8 of generally cylindrical form is rotatably mounted within the cavity 4 of the valve body 2 and is sealed with respect thereto by O-rings 10 fitting within grooves 12 formed in the outer surface of the spindle 8. The lower end 14 of spindle 8 is held in spaced relation with respect to the lower surface 6 of the cavity 4 by means of a nylon or similar screw 16 which extends into the annular groove 18 near the upper portion of the spindle. The screw 16 is screwed inward a sufficient distance to bear against the bottom of the groove 18 so as to afford sufficient friction to prevent free swinging of the faucet spout without scoring the metal of which the spindle is formed. Moreover, the clearance between the nylon screw 16 and the upper and lower side walls of the annular groove 18 serves to permit the spindle 8 to move a short distance upward within the cavity 4 of the valve body 2 so that the spindle may be said to float within the cavity when the valve is opened and water or other fluid under pressure enters the lower portion of the cavity 4.

The upper portion 20 of the spindle 8 projects above the upper end of the valve body 2 and may be rounded or otherwise formed to present an attractive appearance to the assembly. The spout 22 of the faucet is threaded at 24 to engage complementary threads 26 in the opening 28 in the upper portion 20 of the spindle 8. As shown in FIG. 1, the spindle 8 is provided with a liquid supply passage 30 which is preferably inclined with respect to the vertical axis of the spindle and positioned so that the upper end 32 of the passage 30 is spaced the maximum practical distance from the entrance to the threaded opening 28. In this way, the opening 28 may be made equal in depth to about ⅔ to ¾ the diameter of the spindle. As a result, a relatively large number of turns of the threads 24 and 26 on the spout 22 and within the opening 28 may be engaged to mount the spout 22 securely in place and provide a strong, durable construction wherein the spout will not break off or become dislodged even though it is subjected to frequent and rough usage in operating the faucet.

As further shown in FIGS. 2, 3 and 4, the lower portion of the spindle 8 is provided with a flattened or reduced portion 34 positioned adjacent, but above, the tapered lower end 14 of the spindle. The lower end of liquid passage 30 through the spindle communicates with the chambers 36 located on opposite sides of reduced portion 34 of the spindle and within the cavity 4 of the valve body 2.

A valve seat member 38 is provided with a tubular reduced end 40 having a passage 42 therethrough and may be formed with external threads or otherwise to secure the valve seat thereon engageable with complementary member in place within an opening 44 in the valve body communicating with the chambers 36. The valve seat member thus projects radially from the valve body 2 and houses the valve member 46. The valve member 46 is provided with a rounded sealing element 48 engageable with a complementary valve seat 50 formed on the interior of the valve seat member 38 adjacent the reduced end 40 thereof. The sealing element 48 may, of course, be made of any suitable or preferred material such as nylon, rubber, plastic, fiber or other conventional or preferred composition.

The valve member 46 has a valve stem or other means connected thereto for actuating the valve, and for this purpose, is preferably provided with a valve stem 52, which projects beyond the inner end of the sealing element 48 and through the passage 42 so as to extend into the cavity 4 of the valve body adjacent the chambers 36 near the lower portions of the spindle 8. The valve stem 52 may be of any suitable form, but preferably is tubular in shape and is slidably movable within the passage 42 so as to guide the valve member and the sealing element 48 thereof in their movement toward and away from the valve seat 50. Ports 54 are formed in the tubular valve stem 52 so as to permit the free flow of liquid between the sealing element 48 and the valve seat 50 and through ports 54 to the interior of the tubular valve stem 52 and thence into the chambers 36 within the cavity 4 of the valve body each time the valve is opened as shown in FIGS. 1 and 3.

The valve member 46 is urged toward the valve seat 50 by a spring 56 and by the pressure of the liquid or fluid being controlled by the valve. The spring 56 has one end thereof secured to the washer 58 on the outer side of the sealing element 48 of the valve member;

whereas, the other end of spring 56 bears against an adapter member 60 threaded into the outer end of the valve seat member 38. Thus, the valve is normally held in a closed position as illustrated in FIG. 2. However, the valve may be moved away from the valve seat against the action of spring 56 and against the pressure of the fluid controlled by the valve so as to assume the open position shown in FIGS. 1 and 3. When thus opened, the fluid or liquid flows past the valve member 48 to the chambers 36 and thence through the liquid passage 30 in the spindle 8 to the opening 28 and the spout 22.

In accordance with the present invention, the construction is greatly simplified by utilizing the spout 22 and spindle 8 for actuating the valve or faucet. For this purpose, the flattened portion 34 of the spindle 8 is formed on at least one of its outer edges with sloping, curved or inclined camming surfaces 62 which are positioned to engage the inner end of the tubular valve stem 52 which extends through the passage 42 in the valve seat member 38 and into the cavity 4 in the valve body.

With this construction, the spindle 8 of the valve is movable by the spout 22 to rotate the spindle about its vertical axis. The camming surfaces 62 of the flattened portion 34 of the spindle are thus movable into and out of engagement with the inner end of the tubular valve stem 52 to actuate the valve. Accordingly, movement of the spout 22 to a position in which it is substantially parallel with the axis of the valve member 46 will cause the camming surface 62 of the reduced portion of the spindle to engage the valve stem 52 and force the valve member outward against the action of spring 56 from the closed position of FIG. 2 to the position of FIG. 3 wherein the valve is opened and water or fluid will flow through the valve to the chambers 36 and thence through the passage 30 in the spindle 8 to the spout 22. However, when the spout 22 is moved in either direction from said parallel position, as for example to the dotted line position of FIG. 3, the camming surface 62 on the reduced portion of the spindle will move away from the valve stem 52 so as to permit the valve to be closed under the action of the spring 56.

The width, shape, and position of the camming surfaces 62 on the spindle 8 can, of course, be varied or chosen as desired to cause the valve member 46 to be actuated in any desired manner and upon movement of the spout 22 or any handle connected to the spindle 8 to or from any predetermined position. The shape and width of the surface 62, may, therefore, cause the valve to be opened and closed either rapidly or gradually and upon movement of the spout or handle and the spindle 8 through any desired arc of rotation. Thus, the faucet can be actuated in any manner desired and upon any desired displacement of the spout 22.

As shown in each of FIGS. 1, 2, and 3 of the drawings, the sealing element 48 of the valve member 46 is preferably provided with an internal metal plate or washer 66 which bears against a shoulder 68 on the shank 70 of the valve stem 52. The reduced portion of shank 70 then may be split or drilled and forced outwardly over the outer face of sealing element 48 by means of a forming tool or otherwise to secure the sealing element fixedly in place with respect to the valve stem. At the same time, the washer 66 and shoulder 68 will serve to hold the sealing element in spaced relation from the tubular portion 52 of the valve stem so as to afford a fixed and adequate clearance for flow or fluid over the rounded surface of the sealing element to the ports 54 and the interior of the tubular valve stem 52.

In the construction chosen for purposes of illustration in the drawings, the valve stem 52 is tubular in form and serves to guide the valve member 46 in its movement toward and away from the valve seat. However, the form and size of the valve stem and the design and construction of the valve member may be varied as desired to assure the desired operation of the valve or faucet. In a similar way, the form of the reduced portion 34 of the spindle and the camming surfaces or other valve actuating means on the spindle can be varied or designed in numerous ways to assure the desired operation of the valve upon rotation of the spindle. The spindle 8 of the valve can be provided with a handle or operating means other than the spout 22, but such operating means is not ordinarily necessary. Furthermore, the entire valve member 46 can, if desired, be made of a suitable plastic material such as nylon, Delrin, or the like.

It will, thus, be apparent that numerous changes and modifications can be made in the form, construction, and arrangement of the various elements of the combination. Therefore, it should be understood that the particular embodiment of the invention shown in the drawings and described above is intended to be illustrative only and is not intended to limit the scope of the invention.

I claim:

A swing-type faucet or valve assembly comprising a body having a cavity therein, a spindle of generally cylindrical form located in said cavity and rotatable about the longitudinal axis of the spindle, said spindle having an end portion projecting beyond said body and provided with a radially directed opening on one side thereof, a liquid passage extending through said spindle and inclined with respect to the longitudinal axis of the spindle, one end of said passage communicating with said radially directed opening at a point located near the opposite side of said spindle so that the depth of said opening exceeds the radius of the spindle, said opening having threads extending substantially the full depth thereof, a spout having threads on the end thereof engaging a plurality of turns of the thread in said opening, said spout extending substantially radially from the projecting end portion of the spindle and operable to rotate the spindle about its longitudinal axis from one position to another, the portion of said spindle located within said cavity being provided with a flattened port presenting a circumferentially inclined camming surface, a member secured to said body having a fluid opening communicating with the cavity in said body and formed with a valve seat surrounding said opening, a valve housed within said member, means including a spring for urging said valve toward said valve seat to close said fluid opening, a valve stem connected to said valve and projecting through said fluid opening into said cavity, said valve stem being engageable by the camming surface on the reduced portion of the spindle to move said valve away from said valve seat against the action of said spring when said spindle is rotated by movement of said spout about its longitudinal axis from one position to another.

References Cited by the Examiner

UNITED STATES PATENTS

| | | | |
|---|---|---|---|
| 1,005,206 | 10/11 | Heidmann | 137—616.5 |
| 1,349,823 | 8/20 | Wiegand | 251—309 XR |
| 1,690,005 | 10/28 | Ford | 251—310 XR |
| 2,504,610 | 4/50 | Wolf | 137—616.5 |
| 2,790,632 | 4/57 | Mellette | 251—352 |
| 3,016,722 | 10/63 | Logan et al. | 137—616.5 |

FOREIGN PATENTS

| | | |
|---|---|---|
| 88,270 | 11/56 | Norway. |
| 212,622 | 3/41 | Switzerland. |

LAVERNE D. GEIGER, *Primary Examiner.*